United States Patent
Eguchi

(10) Patent No.: US 6,172,482 B1
(45) Date of Patent: Jan. 9, 2001

(54) BATTERY PROTECTION CIRCUIT AND ELECTRONIC DEVICE

(75) Inventor: Yasuhito Eguchi, Kanagawa (JP)

(73) Assignee: Sony Corporation, Tokyo (JP)

(*) Notice: Under 35 U.S.C. 154(b), the term of this patent shall be extended for 0 days.

(21) Appl. No.: 09/379,499

(22) Filed: Aug. 23, 1999

(30) Foreign Application Priority Data

Aug. 26, 1998 (JP) ............................................. P10-240477

(51) Int. Cl.⁷ ................................................. H01M 10/76
(52) U.S. Cl. ................................................. 320/134; 320/136
(58) Field of Search ................................. 320/127, 128, 320/134, 136

(56) References Cited

U.S. PATENT DOCUMENTS 5,703,463 * 12/1997 Smith .

* cited by examiner

Primary Examiner—Edward H. Tso
(74) Attorney, Agent, or Firm—Frommer Lawrence & Haug, LLP.; William S. Frommer

(57) ABSTRACT

A secondary battery needs to be protected by an inexpensive structure having a small number of components. To this end, the structure includes a fuse 41 with a heater, connected to a positive electrode side of a battery cell 2, as a secondary battery, a driving FET 42 for driving the heater of the fuse 41 and a detection control IC 3 which, on detecting at least the over-charging state of the battery cell 2, drives the driving FET 42 to fuse the heater of the fuse 41.

6 Claims, 10 Drawing Sheets

C1: OVERCHARGING DETECTION UNIT

*C1*: OVERCHARGING DETECTION UNIT

BATTERY PROTECTION CIRCUIT AND ELECTRONIC DEVICE

BACKGROUND OF THE INVENTION

1. Field of the Invention

This invention relates to a battery protection circuit for preventing at least overcharging of a secondary battery and an electronic device having the battery protection circuit.

2. Description of the Related Art

Among electronic devices loaded with battery packs for power supply, also referred to as a battery package, and adapted for being fed from the battery pack with the power for driving the devices, there are, for example, a portable so-called note-book type personal computer, occasionally abbreviated to note-book personal computer, an information terminal, a video tape recorder, a sound recorder, and a portable telephone. Among non-portable type electronic devices of this type, there is, for example, an electric car having, for example, a motor for assisting the motive power.

The battery packs used in these electronic devices are frequently provided with secondary battery cells that can be charged/discharged repeatedly. As such secondary battery cells, so-called lithium ion secondary batteries, having a high volumetric energy density, are frequently used.

However, the lithium ion secondary batteries are narrow in tolerance values for over-charging or over-discharging. Thus, the battery packs are usually provided with a battery protection circuit for preventing over-charging or over-discharging of the lithium ion secondary batteries.

FIG. 1 shows an illustrative structure of a conventional battery protection circuit provided in a battery pack 200 having a lithium ion secondary battery cell 202.

Referring to FIG. 1, terminals 211, 212 are charging/discharging terminals of the battery pack, with the terminal 211 being a battery plus terminal and with the terminal 212 being a battery minus terminal (GND side terminal). The battery pack 200 furnishes the current via these plus terminal 211 and minus terminal 212 from the battery cell 202 to a main body portion of the electronic device, by way of charging. On the other hand, the battery pack 202 is charged by the charging current furnished from an external charger, not shown, via these plus terminal 211 and minus terminal 212.

A field effect transistor (FET) 206 and another field effect transistor (FET) 205 are connected in series between a plus terminal 211 of the battery pack 200 and the positive terminal of the battery cell 202. The FETs 206, 205 are provided as a charging on/off controlling switching device and as a discharging on/off controlling switching device, respectively. These FETs 205, 206 are provided with parasitic diodes.

A control IC circuit 203 has its terminal 235 fed with a voltage value of the plus terminal 211, while having its terminals 231 and 232 fed with the positive terminal side voltage value and with the negative terminal side voltage value of the battery cell 202, respectively. The control IC circuit 203 outputs a driving signal for the switching operation (on/off operation) of the FET 206 and a driving signal for the switching operation (on/off operation) of the FET 205 from its terminals 233, 234, respectively. That is, the control IC circuit 203 monitors a voltage value of the plus terminal 211 and the voltage values of the positive and negative terminal sides of the battery cell 202 to control the switching operation (on/off operation) of the FETs 205, 206.

Meanwhile, in the battery pack employing the FET for charging/discharging control, as shown in FIG. 1, the two FETs 205, 206 are provided for charging/discharging control, these FETs 205, 206 being connected in series between the plus terminal 211 and the positive terminal side of the battery cell 202, thus undesirably raising the internal resistance. Although there is such a battery protection circuit having FETs connected in parallel to realize a low internal resistance, the number of component parts is increased in this case to raise the cost.

There are occasions wherein it is necessary to provide a spare protection circuit in addition to the inherent protection circuit, that is two protection circuits, thus further increasing the number of components and increased cost.

If, with the use of a dual FET with the outer shape TSSOP and an N channel, with a drain-to-source withstand voltage of 20 V, a gate withstand voltage of 12 V and with an on-resistance of 35 mΩ, with gate voltage being 2.5 V, two such parallel-connected FETs are used for charging/discharging, the element resistance is 70 mΩ, that is the resistance per FET is 35 mΩ. On the other hand, if these FETs are connected in series with each other, the element resistance is 35 mΩ, that is the resistance per FET is 17.5 mΩ. FIG. 1 shows an example of a P-channel FET, which has a higher internal resistance than the N-channel FET, so that it is more undesirable.

SUMMARY OF THE INVENTION

It is therefore an object of the present invention to provide an inexpensive battery protection circuit made up of a smaller number of components and an electronic device provided with a battery pack having the battery protection circuit.

In one aspect, the present invention provides a battery protection circuit including over-charging detection means for detecting at least the over-charging state of a secondary battery, fuse means fitted with the heater and which is connected to a current path of the secondary battery, and heater driving means for driving the heater of the fuse means. The heater driving means drives the heater of the fuse means to blow off the fuse when the over-charging detection is established.

In another aspect, the present invention provides an electronic device operated by the current supplied from a secondary battery and adapted to charge the secondary battery, including a battery pack having over-charging detection means for detecting at least the over-charging state of a secondary battery, fuse means fitted with a heater, and which is connected to a current path of the secondary battery; and heater driving means for driving the heater of the fuse means. The heater driving means drives the heater of the fuse means to blow off the fuse when the over-charging detection is established.

According to the battery protection circuit and the electronic device, according to the present invention, the fuse of the heater connected to the current path of the secondary battery is blown off on detection of at least the over-charging state of the secondary battery. Thus, the secondary battery is protected by an inexpensive structure with a smaller number of component parts.

DESCRIPTION OF THE PREFERRED EMBODIMENTS

Figure 1:
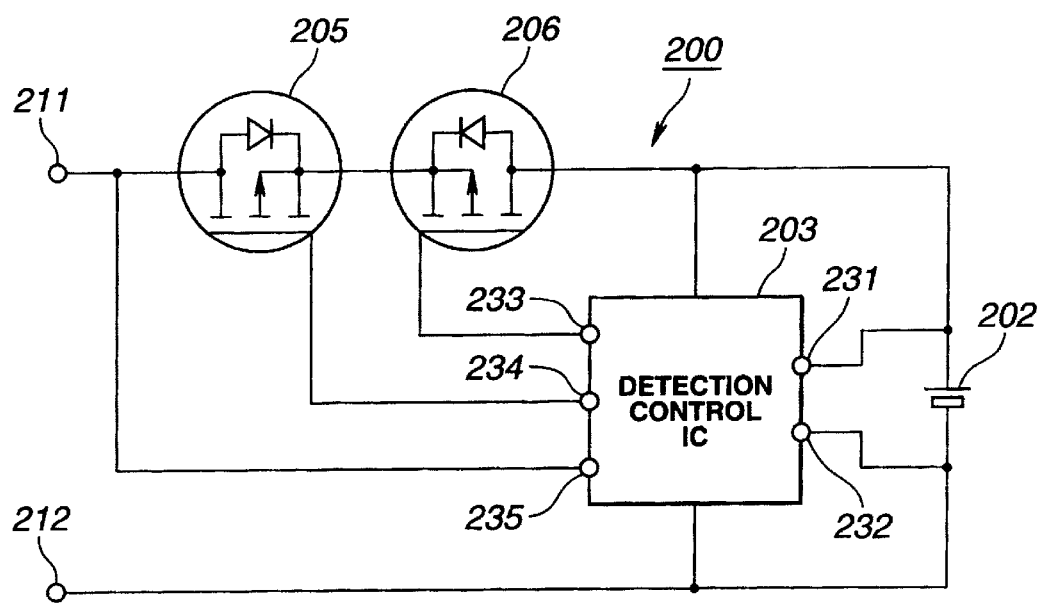
FIG. 1 is a schematic circuit diagram showing a battery pack haprovided with a conventional battery protection circuit.

Referring to the drawings, preferred embodiments of the present invention will be explained in detail.

The battery protection circuit of the present invention can be provided within a battery pack used on, for example, a notebook type personal computer, an information terminal, a video tape recorder or a sound recorder, as a portable electronic apparatus, and on an electric bicycle having a driving power assisting motor, as a non-portable type electronmic device. It is noted that the embodiments given below are merely illustrative and are not intended for limiting the scope of the invention.

Figure 2:
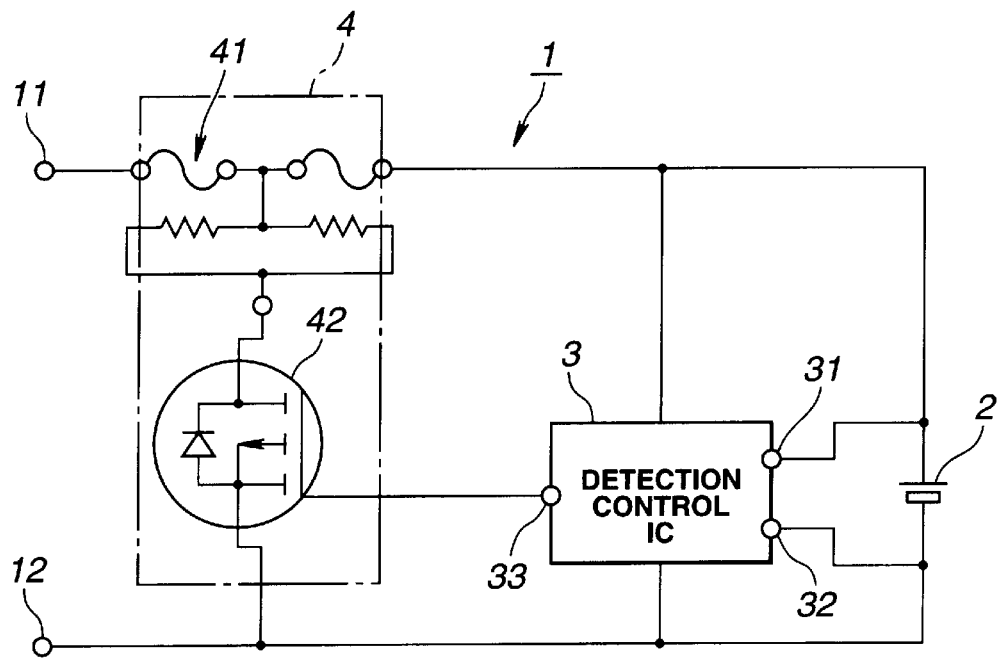
FIG. 2 is a circuit diagram for illustrating a specified internal structure of a detection control IC of a battery pack of a first embodiment of the present invention.

FIG. 2 shows a schematic structure of a battery protection circuit according to a first embodiment of the present invention.

Referring to FIG. 2, a battery cell 2 is one of, for example, a lithium ion secondary cell, a lead secondary accumulator, a Ni—Cd secondary battery (nickel-cadmium secondary battery), a Ni hydrogen secondary battery (nickel-hydrogen secondary battery), a N—Zn battery (nickel-zinc accumulator), a polymer secondary battery, and an air Zn secondary battery (zinc-air battery). In the preferred embodiment, it is assumed that a lithium ion secondary battery is used as the battery cell 2.

The terminals 11, 12 are equivalent to charging/ discharging terminals of the battery pack 1 and operate as a battery plus terminal, referred to below as a plus terminal 11, and as a battery minus terminal GND, referred to below as the minus terminal 12. The battery pack 1 furnishes the power from the battery cell 2 to the main body portion of the electronic device via these terminals 11, 12, by way of discharging. On the other hand, the battery cell 2 is charged by the charging current from the charging current furnished from the external charger, not shown, via these terminals 11, 12.

An over-charging protection unit 4 is made up of a fuse fitted with a heater 41 and a driving FET 42 for driving the heater of the fuse fitted with the heater 41. The fuse portion of the fuse fitted with the heater 41 is inserted and connected between the plus terminal 11 of the battery pack 1 and the positve terminal of the battery cell 2, while the gate of the drive FET 42 is connected to an over-charging control terminal 33 of a detection control IC 3. If, in the over-charging protection unit 4, the driving FET 42 is fired, curent flows in the fuse fitted with the heater 41 to heat up the heater to raise its temperature. If, as a result of temperature increase in the heater, caused by the current flowing therein, such that the melting point of the fuse is reached by the continued temperature increase in the heater, the fuse is blown off, thus interruptiung the connection between the plus terminal 11 and the positive terminal of the battery cell 2. It is noted that the internal resistance of the fuse fitted with the heater 41 is 10 mΩ or less, such that the internal resistance of the battery protection circuit of FIG. 2 is extremely low.

The detection control IC 3 has its cell plus terminal detection terminal 31 and a cell minus terminal 32 fed with a positive electrode side vlotage value of the battery cell 2 and with the negative electrode side voltage value of the battery cell 2, respectively, while outputting a driving signal for switching operation (on/off operation) for the driving FET 42 of the over-charging protection unit 4 from the over-charging control terminal 33. This driving signal for switching operation is referred to below as an over-charging control signal. That is, the detection control IC 103 monitors voltage values on the positive and negative electrode sides of the battery cell 2 to output a driving control signal (over-charging control signal) based on these voltage values to control the switching (on/off operation) of the driving FET 4 of the over-charging protection unit 4, in order to control the switching operation (on/off operation) of the driving FET 42 of the over-charging protection unit 4. The specified internal structure of the detection control IC 103 will be explained subsequently.

During charging of the battery pack 1, the charging current is furnished from an external charger, not shown, via the plus terminal 11 and the minus terminal 12. This charging current charges the battery cell 2 to increase the cell voltage. If the voltge of the external charger is limited to the full charging voltage of the battery cell 2, the battery cell 2 is charged to this full charging voltage without being raised to a higher voltage.

However, if the external charger is in disorder or is a charger for an incorrect voltage, such that a high charging voltage is applied across the battery cell 2, the cell voltage of the battery cell 2 is raised to higher than the fill charging voltage.

The above-described detection control IC 3 is detecting the cell voltage of the battery cell 2 by the positive electrode side voltage value from the cell plus voltage detection terminal 31 and the negative voltage side voltage value from the minus terminal 12, such that, if the cell voltage reaches an over-charging protection voltage, as a pre-set voltage, the detection control IC 3 outputs, from the over-charging control terminal 33, a driving signal for firing the driving FET 42 (over-charging control signal).

If the driving FET 42 is fired in this manner, the fuse fitted with the heater 41 of the over-charging protection unit 4 is heated and blown off to interrupt the charging current to the battery cell 2. This enables prohibition of over-charging to the battery cell 2.

The fuse fitted with the heater 41 may be of the non-restorable type, that is of the type in which it cannot be restored to the conducting state once it is blown off. Therefore, if the battery protection action once occurs, that is if once it is blown, it cannot be re-used. However, the above-described operation is thought to be sufficient as the operation of the battery protection circuit because there is no risk of occurrence of the over-charging protection operation as long as charging is executed using a charger of the correct nominal charging voltage.

The battery protection circuit of the above-described first embodiment is felt to be most suited to a system in which the following precautions are used. That is, the battery protection circuit of the preferred embodiment preferably is such a system in which the battery protection circuit is loaded on a battery pack having charging/discharging terminals difficult to short and in which the electronic device employing the current pack is provided with a mechanism for turning off the discharging current on over-discharging, with the leakage current following the turning off of the discharging current being extremely small. The shape of the chareging/discharging terminal in the battery pack needs to be contrived to prevent the fuse from being blown off due to shorting caused by some mistake or other such as duing transport of the battery pack or when the battery pack is being handled by itself. The function of turning off of the discharging current on the side of the electronic device is required for protecting the battery cell from over-discharging. The allowable leakage current after turning off the discharging current, determined on the basis of the residual capacity until the battery cell is drastically deteriorated by the over-discharging as from the ends of discharging and the allowable time during which the battery pack may be left mounted on the electronic device in use, is preferably 1 $\mu$A or less.

The specified internal structure of the detection control IC 3 of the first embodiment of the battery protection circuit shown in FIG. 2 is explained with reference to FIG. 3.

Figure 3:
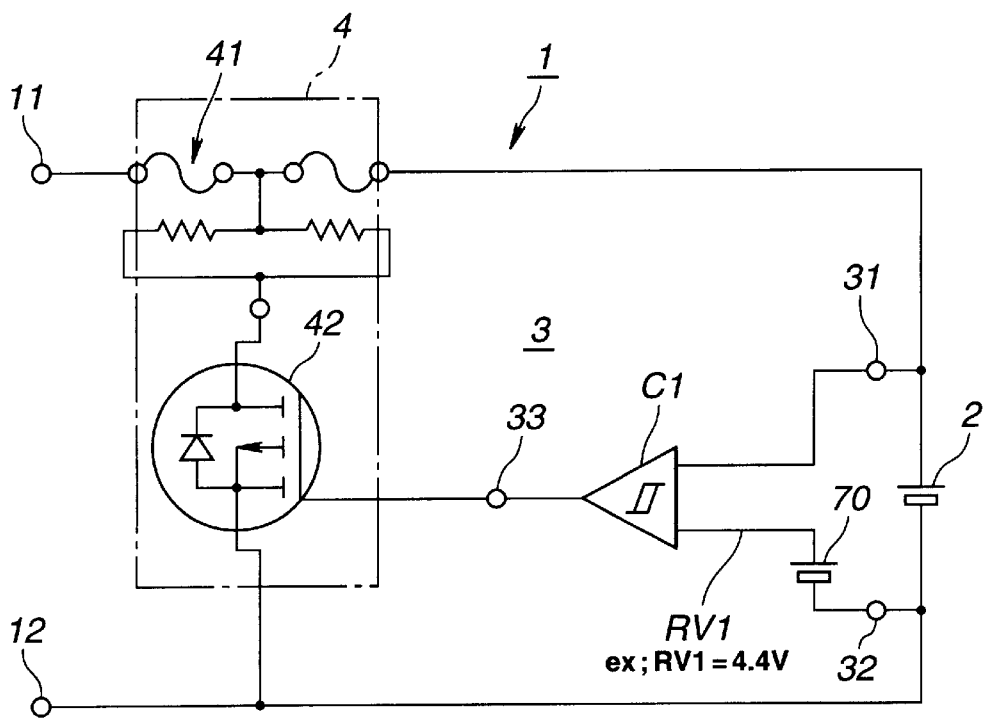
FIG. 3 is a schematic circuit diagram for illustrating a specified internal structure of a detection control IC of the first embodiment of the battery pack

Referring to FIG. 3, the detection control IC 3 is made up of an overcharging detection unit C1 having the function as a comparator with hysteresis and which is adapted for detecting the overcharging of the battery cell 2, and an over-charging reference voltage source 70 for generating an over-charging detecting reference voltage RV1 corresponding to the overcharging protection voltage. In the preferred embodiment, the over-charging detecting reference voltage RV1 is set to, for example, 4.4 V.

The overcharging detection unit C1 compares the cell voltage of the battery cell 2 inputted from the cell plus voltage detection terminal 31 (positive electrode side voltage) to the over-charging detecting reference voltage RV1 from the over-charging reference voltage source 70. If the cell voltage is higher than the over-charging detecting reference voltage RV1 (4.4 V), the overcharging detection unit C1 outputs a high-level signal (H-signal) as an over-charging control signal from the over-charging control terminal 33.

The over-charging control signal, outputted by this over-charging control terminal 33, is a driving signal for the driving FET 42, such that, when the over-charging control signal is at the H-level, the driving FET 42 is fired to heat up the heater of the fuse fitted with the heater 41 to blow off the fuse. This assures protection against over-charging of the battery cell 2.

The purpose of providing the hysteresis in the comparator of the overcharging detection unit C1 is to maintain the over-charging detection state even if the voltage of the battery cell 2 is lowered by the current flowing when the driving FET 42 is turned on. The comparator of the over-charging detection unit C1 is preferably provided with dead time of tens of msec to several sec for the comparator of the overcharging detection unit C1.

A second embodiment o the battery protection circuit of the present invention is hereinafter explained.

Figure 4:
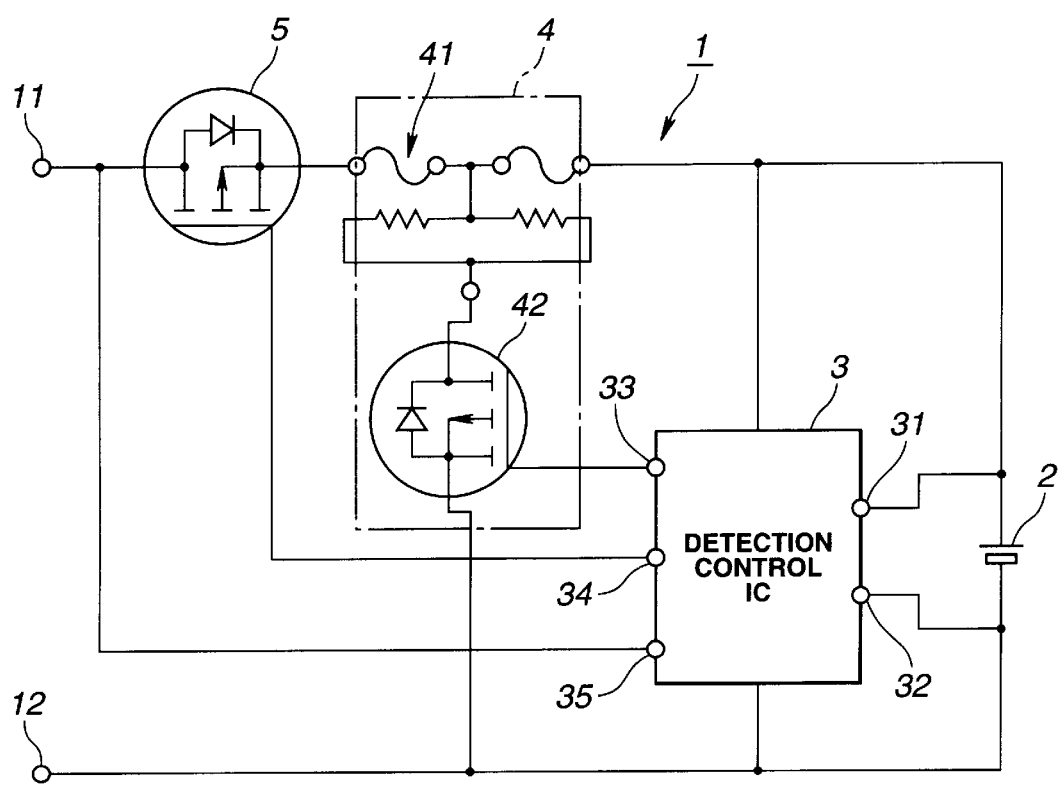
FIG. 4 is a schematic circuit diagram for illustrating the structure of a second embodiment of the battery pack.

FIG. 4 shows the schematic structure of a battery protection circuit according to a second embodiment of the present invention. The battery protection circuit of the present second embodiment, shown in FIG. 2, corresponds to the structure of FIG. 2 also having an FET for protection against over-charging and over-current, referred to below as a discharging control FET 5. In the second embodiment, limiting conditions for the equipments in use are less strict, and only one discharging controlling FET 5 is added, so that the internal resistance is smaller. It is noted that, in FIG. 4, parts or components similar to those of FIG. 2 are depicted by the same reference numerals and are not explained specifically.

The discharging controlling FET 5 is inserted and cponnected between the plus terminal 11 and, for example, the fuse portion of the fuse fitted with the heater 41 of the over-charging protection unit 4, and has its gate connected to a discharging controlling FET control terminal 34 of the detection control IC 3.

Also, the detection control IC 3 of the present second embodiment has a terminal voltage detection terminal 35 connected to the plus terminal 11 and detects the over-charging and over-current based on the voltage and current values supplied via this terminal voltage detection terminal 35. On detection of the over-charging or the over-current, the detection control IC 3 outputs a driving signal for switching (on/off operation) of the discharging controlling FET5, referred to below as the discharge FET control signal, from the discharging controlling FET control terminal 34. Meanwhile, the detection control IC 3 detects the current by voltage drop caused by the on-resistance of the discharging controlling FET 5 and the voltage drop across the fuse resistor of the fuse fitted with the heater 41.

If the battery cell 2 is in the over-discharging state, the detection control IC 3 detects the over-discharging and turns off the discharging controlling FET 5 by the discharging FET control signal from the discharging controlling FET control terminal 34 (over-discharging protection operation). This turns off the current from the battery pack 1 to the load, that is the equipment in use, as a result of which the battery cell 2 can be prevented from becoming over-discharged. Also, if the battery cell 2 is in the over-current state due to, for example, terminal shorting, the detection control IC 3 detects the over-current to turn off the discharging controlling FET 5 by the discharging FET control signal from the discharging controlling FET control terminal 34 (over-current protection operation). This prevents destruction of the battery cell 2, that is the battery pack 1.

The detection control IC 3 of the present second embodiment also has the function of detecting the full charging voltage of the battery cell 2, based on the positive electrode side voltage value from the cell plus voltage detection terminal 31 and the negative electrode side voltage value from the cell minus voltage detection terminal 32 to turn off the discharging controlling FET 5 by the discharging FET control signal from the discharging controlling FET control terminal 34 if the full charging voltate is detected ultimately. That is, if the battery cell 2 is in the full charging voltage, the detection control IC 3 turns off the discharging controlling FET 5 by the discharging FET control signal from the discharging controlling FET control terminal 34. The specified internal structure of the detection control IC 3 for the second embodiment will be explained subsequently.

In the discharging controlling FET 5, there exists the parasitic diode, as shown in FIG. 4. Therefore, if the discharging controlling FET 5 is turned off, the current in the discharging direction may be turned off, however, the current in the charging direction cannot be turned off, however, the current in the charging direction cannot be turned off. However, the current in the charging direction can also be turned off for the potential difference within the forward voltage drop Vf. That is, the charging current can also be turned off if the maximum voltage VCma of the charger is within a certain range. Thus, in the present second embodiment of the battery protection circuit, it is possible to control the battery cell 2 to its fully charged state in the interior of the battery pack 1 by turning off the discharging controlling FET 5 responsive to the detection of the fill charging voltage of the battery cell 2 to control the charging current.

Also, if the present second embodiment is provided with full charging control means for controlling the battery cell 2 to the fully charged state in the inside of the battery pack 1, the following merit is accrued. That is, if there is not provided in the battry pack the overcharging control means such as that provided in the second embodiment, the full charging voltage of the battery cell 2 needs to be controlled on the charger side, so that the voltage generating portion needs to be designed to high precision. If conversely the overcharging control means such as that provided in the second embodiment is provided in the battery pack 1 as in the second embodiment, the voltge generating portion of the charger can be lowered, that is the voltage allowance range in the charger can be broader, so that it is possible to use a less costly charger. As a more specified example, if, with the full charging voltage in the battery cell 2 of 4.2 to 4.25 V, there is not provided the full voltage control means in the battery pack, the voltage on the charger side needs to be of a precision of 4.225±0.025 V, whereas, if there is provided no full charging control means on the charger side, the charger side voltage is 4.2 V to 4.7 V for the forward voltage drop of the parasitic diode Vf=0.5 V.

Thus, in the present second embodiment, the discharging controlling FET 5 can also be used for charging control, though to a limited extent.

On the other hand, if the cell voltage of the battery cell 2 is higher than the full charing voltage, the discharging controlling FET 5 is turned off. The battery cell 2 can be discharged from this state as follows:

First, if a load is connected to the plus terminal 11 and the minus terminal 12 when the discharging controlling FET 5 is off, the voltage at the plus terminal 11 is lowered toeards the potential of the minus terminal 12. The potential of the plus terminal 11 is monitored by the detection control IC 3 via terminal voltage detection terminal 35, such that, if the potential at the plus terminal 11 is lower by a certain value (VM) than the potential of the positive electrode side of the battery cell 2 (potential of the cell plus voltage detection terminal 31), the detection control IC 3 controls the discharging controlling FET 5 in the on-direction, by the discharge FET control signal from the discharging controlling FET control terminal 34, to allow the flowing of the discharging current. This is tantamount to the discharging with the charging FET (FET 206 of FIG. 1) in the prior-art example being turned off. Since the FET 206 of FIG. 1 has been discharged in an amount corresponding to the forward voltage drop of Vf of the parasitic diode, it may be presumed that no practical problem is raised if the above value VM is set to several hundreds of mV. However, there are occasions wherein a smaller value of the voltage drop by the parasitic diode is desirable. Therefore, the value VM is set to several mV to hundreds of mV, if so disired.

In controlling the discharging controlling FET 5 by detecting the above value VM, there may be contemplated a method of digitally turning the gate voltage of the FET 5 on/off and a method of analogically controlling the gate voltage. Although these methods are not explained in detail, it is possible to make designing so that approximately the same results will be obtained by these methods.

Figure 5:
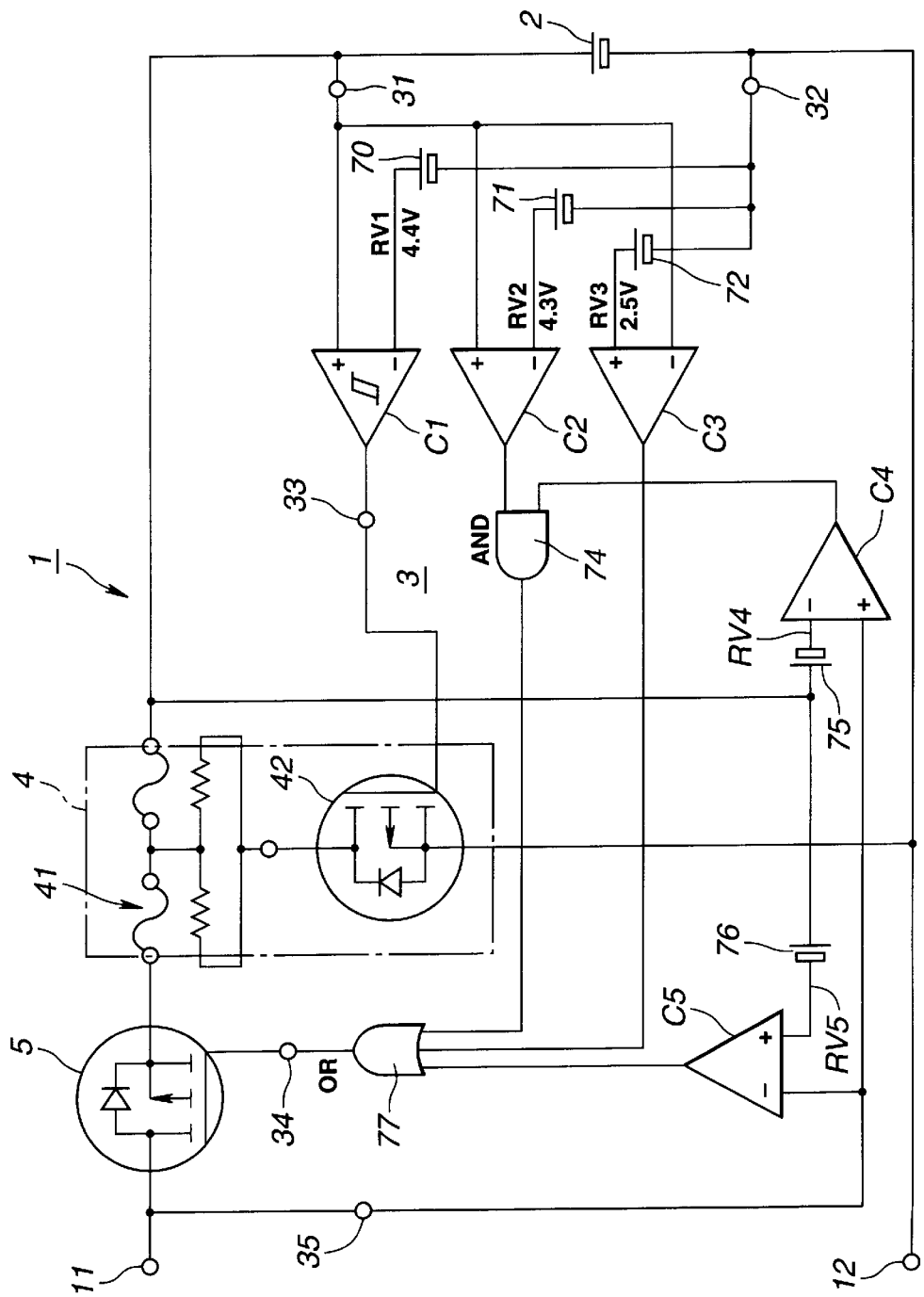
FIG. 5 is a circuit diagram for illustrating the specified internal structure of a detection control IC of the second embodiment of the battery pack.

Referring to FIG. 5, the specified internal structure of the detection control IC 3 of the second embodiment shown in FIG. 4 is explained. It is noted that components similar to those shown in FIG. 3 are depicted by the same reference numerals and are not explained specifically.

Referring to FIG. 5, the detection control IC 3 includes a first over-charging detection unit C1, having the function similar to that of the overcharging detection unit C1 shown in FIG. 3, and a second over-charging detection unit C2, which is provided with a first overcharging reference voltage source 70 for generating a reference voltage RV1 similar to that produced by the reference voltage source 70 of FIG. 3, and which has the function as a comparator for detecting the over-charging of the battery cell 2. The detection control IC 3 also includes a second over-charging reference voltage source 71 for generating a second detection reference voltage RV2 corresponding to the full charging voltage of the battery cell 2, an overcharging detection unit C3, having the function of a comparator for detecting the over-discharing, and an over-charging reference voltage source 72 for generating an over-discharging detection reference voltage RV3 as a reference for detecting the over-charging in the over-charging detection unit C3. The detection control IC 3 also includes an excess current detection unit C5 having the function as a comparator for detecting the excess current, and an excess current reference voltage source 76 for generating an excess current detecting reference voltage RV5 as a reference for detecting the excess current in the excess current detection unit C5. The detection control IC 3 also includes a discharging state detection unit C4, having the function of a comparator for detecting the discharging state, a discharging state reference voltage source 75 for generating a discharging state detection reference voltage RV4 as a reference for detecting the discharging state in the discharging state detection unit C4, an AND (logical product) gate 74 and an OR (logical sum) gate 77. In the preferred embodiment, the first over-discharging detection reference voltage RVI is set to, for example, 4.4 V, the second over-discharging detection reference voltage RV2 is set to a smaller value of say tens of mV and the excess current detecting reference voltage RV5 is set to a value corresponding to the current value of the order of one hundred and several tens of mV to several hundreds of mV desired to be detected.

As in the case of FIG. 3, the first over-charging detection unit C1 compares the cell voltage (voltager of the positive electrode side) of the battery cell 2 to the first excess current detecting reference voltage RV1 from the first overcharging reference voltage source 70 and outputs an H-lvel signal as an over-charging control signal from the excess current control terminal 33 when the cell voltage becomes higher than the first over-discharging detection reference voltage RV1 (4.4 V). This fires the driving FET 42 ti heat up the heater of the fuse fitted with the heater 41 to blow of the fuse to protect he battery cell 2 against excess charging.

The second over-charging detection unit C2 compares the cell voltage (positive electrode side voltage) of the battery cell 2, inputted from the cell plus voltage detection terminal 31, to the second excess current detecting reference voltage RV2 from the second over-charging reference voltage source 71, and issues an H-level signal when the cell voltage becomes higher than the second over-discharging detection reference voltage RV2 (4.3 V) (over-charging state). An output signal of the second over-charging detection unit C2 is sent to one of the input terminals of the two-input AND gate 74.

The discharging state detection unit C4 compares the voltage of the plus terminal 11, inputted from the terminal voltage detection terminal 35, to the discharging state detection reference voltage RV4 from the discharging state reference voltage source 75, and outputs a low-level (L-level) signal if the voltage of the plus terminal 11 becomes lower than the discharging state detection reference voltage RV4 of a smaller value of the order of tens of mV. An output signal of the discharging state detection unit C4 issent to the opposite input terminal of the two-input AND gate 74.

The overcharging detection unit C3 compares the cell voltage of the battery cell 2 inputted from the cell plus voltage detection terminal 31 (positive electrode side voltage) to the over-discharging detection reference voltage RV3 from the over-charging reference voltage source 72 and outputs an H-level signal if the cell voltage becomes lower than the over-discharging detection reference voltage RV3 (2.5 V) (over-discharging stat). An output signal of the overcharging detection unit C3 is sent to the first input terminal of a three-input OR gate 77.

The excess current detection unit C5 compares the voltage of the plus terminal 11, inputted from the terminal voltage detection terminal 35, to the excess current detecting reference voltage RV5 of the plus terminal 11, and outputs an H-level signal if the voltage at the plus terminal 11 becomes lower than the excess current detecting reference voltage RV5 of a value corresponding to the current value of from one hundred and tens of mV to hundreds of mV desired to be detected (excess current state). An output signal of the over-charging detection unit C3 is sent to the second input terminal of the three-input OR gate 77.

The two-input AND gate 74 takes a logical sum of an output of the second over-charging detection unit C2 and an output of the discharging state detection unit C4. An output signal of the two-input AND gate 74 is sent to a third input terminal of the three-input OR gate 77.

In this three-input OR gate 77, a logical sum is taken of the output of the overcharging detection unit C3, an output of the excess current detection unit C5 and an output of the two-input AND gate 74. An output signal of the three-input OR gate 77 is sent from the discharging controlling FET control terminal 34 as the discharging FET control signal to the discharging controlling FET 5.

In the normal state, the outputs of the second overcharging detection unit C2, the overcharging detection unit C3 and the excess current detection unit C5 are at L level, while the output of the discharging state detection unit C4 is at the H level, so that the gate voltage of the discharging controlling FET 5, that is the voltage of the discharging controlling FET control terminal 34, is at the L level. Therefore, the discharging controlling FET 5 in the normal state is in the on-state.

If, as there flows the charging current, an over-charging is detected at the second over-charging detection unit C2, an output of the second over-charging detection unit C2 is at the H level. Since the output of the discharging state detection unit C4 is at the H level, the output of the two-input AND gate 74 is at the H level. Thus, if the output of the overcharging detection unit C3 is at the L level, the output of the three-input OR gate 77 is at the H level, so that the discharging controlling FET 5 is turned off With the discharging controlling FET 5 off, the charging current is turned off.

If, when the over-charged state is established, such that the discharging controlling FET 5 is turned off, it is tried to disconnect the battery pack 1 from the charger to discharge the current, the discharging current is not allowed to flow because the discharging controlling FET 5 is turned off. The purpose of providing the discharging state detection unit C4 is to avoid this inconvenience. If, in an attempt to cause the discharging current to flow, the discharging load is connected to the plus terminal 11 and to the minus terminal 12, the voltage of the plus terminal 11 is lowered to lower the voltage at the terminal voltage detection terminal 35, such that the output of the discharging state detection unit C4 is at the L level. That is, one of the inputs of the two-input AND gate 74 is at the L level, so that the output of the two-input AND gate 74 is naturally at the L level. If both the output of the overcharging detection unit C3 and the output of the excess current detection unit C5 are at the L-level, the output of the three-input OR gate 77 is at the L-level, that is the discharging controlling FET 5 is fired. With the discharging controlling FET 5 on, the voltage of the plus terminal 11 and that of the terminal voltage detection terminal 35 are high, so that the output of the discharging controlling FET control terminal 34 and that of the discharging controlling FET 5 again seek to reach a H level. If the output of the discharging state detection unit C4 and the gate voltage of the discharging controlling FET 5 are completely at the H level, the discharging controlling FET 5 is turned off to repeat the above-described process. However, if the circuit configuration is set so that the output of the discharging state detection unit C4 and the gate voltage of the discharging controlling FET 5 are not completely at the H level, but may assume an arbitrary incomplete H level, the on-state of the discharging controlling FET 5 is controlled so that the voltage drop by the current flowing in the load is just in equilibrium with the discharging state detection reference voltage RV4 of the discharging state detection unit C4. Meanwhile, a smaller value of the discharging state detection reference voltage RV4 is desirable since it reduces wasteful losses. Therefore the discharging state detection reference voltage RV4 is set to as small a value as possible, as caution is exercised to evade malfunction due to, for example, noise.

If the output of the overcharging detection unit C3 is at the H-level, the gate of the discharging controlling FET 5 is at the H-level, so that the discharging controlling FET 5 is turned off, regardless of the output of the discharging state detection unit C4.

If, with increase in the load current, the voltage of the plus terminal 11 and that of the terminal voltage detection terminal 35 are lowered further, such that the gate voltage of the discharging controlling FET 5 naturally is lowered to the minimum voltage and hence the discharging controlling FET 5 is completely turned on, the output of the excess current detection unit C5 is at the H-level, representing the excess current detecting state, with the discharging controlling FET 5 being completely turned off.

A third embodiment of the battery protection circuit of the present invention is hereinafter explained.

Figure 6:
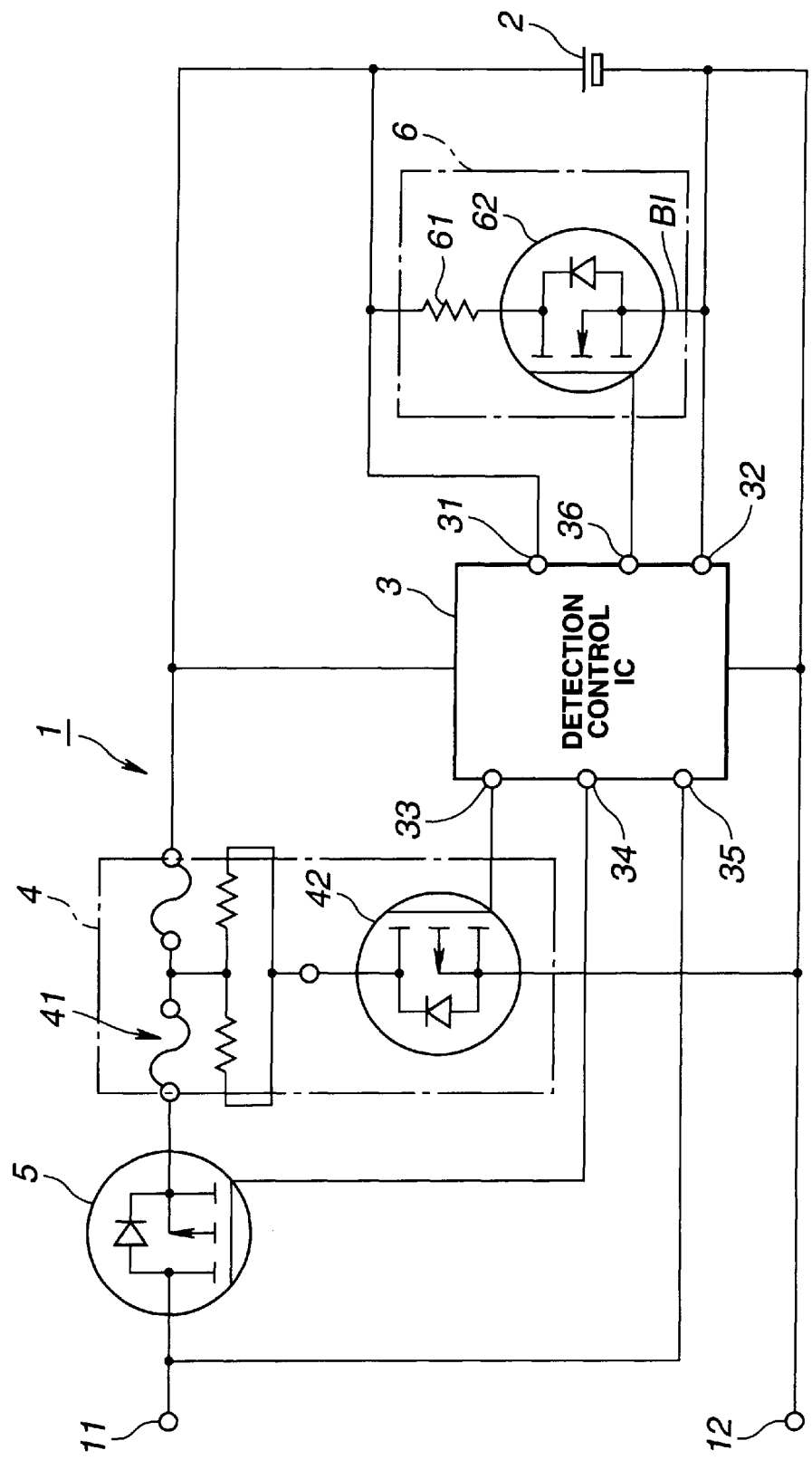
FIG. 6 is a schematic circuit diagram for illustrating the structure of a third embodiment of the battery pack.

FIG. 6 shows the schematic structure of the battery protection circuit according to a third embodiment of the present invention. The battery protection circuit of the present third embodiment, shown in FIG. 6, corresponds to the structure of FIG. 4 to which is added a by-pass unit. In FIG. 6, parts or components corresponding to those of FIG. 4 are depicted by the same reference numerals and are not explained specifically.

The detection control IC 3 in the present third embodiment monitors the status of the cell plus voltage detection terminal 31 and the cell minus voltage detection terminal 32 and, on detection of a pre-set state, outputs a bypass control signal of turning the bypass on to the bypass unit 6.

The bypass unit 6 includes a bypass resistor 61 and an FET, referred to below as a bypass FET 62. When the detection control IC 3 detects a pre-set state such that the bypass control signal is set to bypass-on, the bypass FET 62 is fired, so that there flows a bypass current BI limited by the bypass resistor 61.

As the pre-set state detected by the detection control IC 3, there may be conceived a variety of settings, such as the state (voltage state) of the cell plus voltage detection terminal 31 and the cell minus voltage detection terminal 32 being lower than, equal to or higher than the full charging voltage. The possible presence of the discharging controlling FET 5 or the relative magnitude of the maximum bypass current with respect to the charging current gives rise to difference in usefulness and validity as now exemplified.

As a first exemplary case, it is assumed that there is the discharging controlling FET 5 and the above-mentioned pre-set state is the detection of the full charging voltage. In this case, the charging current flow by the parasitic diode is absorbed by the bypass current during the off-time of the discharging controlling FET 5, with the cell voltage operating to maintain the full charging voltage. The maximum bypass current value can be set to an extremely small value, because only the leakage current needs to be taken into account.

In the second exemplary case, it is assumed that there is no discharging controlling FET 5 and the full charging voltage is to be detected as the above-mentioned pre-set state. In this instance, the bypass current flows under the full charging voltage, whereas, if the charger current is smaller than the maximum bypass current, the cell voltage tends to be maintained at the full charging voltage. On the other hand, if the charging current is large, the battery cell is charged to the maximum voltage of the charger. If the maximum voltage of the charger is higher tam the overcharging voltage, overcharging protection operates so that the fuse of the fuse fitted with the heater is blown off.

Meanwhile, the maximum bypass current is limited due to, for example, heating. For example, in a small-sized battery pack, the heating power that can continuously be supplied is 0.5 W at most, with the heating current for the pack voltage of 4 V being on the order of 125 mA. If the configuration is such that heating caused by the supply of the bypass current is detected to halt the charger, it is possible to allow for larger bypass current. However, the current as small as this can provide a useful system. For example, the system of charging the battery pack of 750 mAh with the charging current of 125 mA is sufficiently useful such that a low-cost charger can be realized, with the maximum charging voltage being limitless as a principle. That is, there may be conceived such a system comprised of a line-up of a low-cost low-power charger for overnight charging and a large-current charger for quick charging having a maximum voltage matched accurately to the full charging voltage.

In the above-described second embodiment, there is provided on discharging controlling FET 5. However, the discharging controlling FET 5 may also naturally be provided, in which case the low cost may be realized because there is no requirement for high voltage precision for the quick charger.

Figure 7:
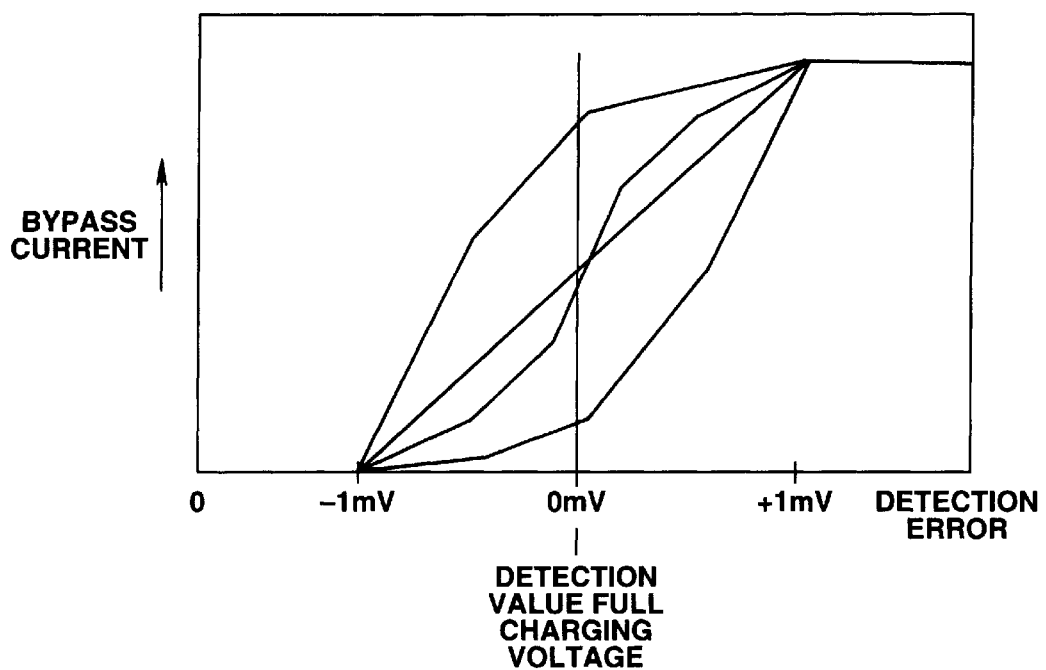
FIG. 7 is a graph for illustrating the relation between the bypass current and a detection error in the third embodiment.

For controlling the cell voltage to be equal to the detection voltage, such a system is desirable in which the magnitude of the bypass current is increased or decreased in connection with the difference between the detection voltage of the detection control IC 3 and the cell voltage. FIG. 7 shows such relation between the cell voltage and the detection voltage. The detection error is expressed as the difference between the cell voltage value and the detected voltage (detection error=cell voltage value−detection voltage). Referring to FIG. 7, straight-line characteristics are most desirable. However, an upward convex curve, a downward convex curve or an S-shaped curve may be used for control performed in the preferred embodiment. Meanwhile, detection error values are merely illustrative and are set by increase or decrease from the system stability. Such a system exhibiting hysteresis or significant delay is not desirable for this sort of control.

A specified internal structure of the detection control IC 3 of the battery protection circuit according to the above-described third embodiment is similar to the structure shown in FIG. 5. However, in the present third embodiment, the connection between the internal structure of the detection control IC 3 and the bypass unit 6 is as shown in FIG. 8, in which parts and components similar to those shown in FIG. 5 are depicted by the same reference numerals and are not explained specifically.

Figure 8:
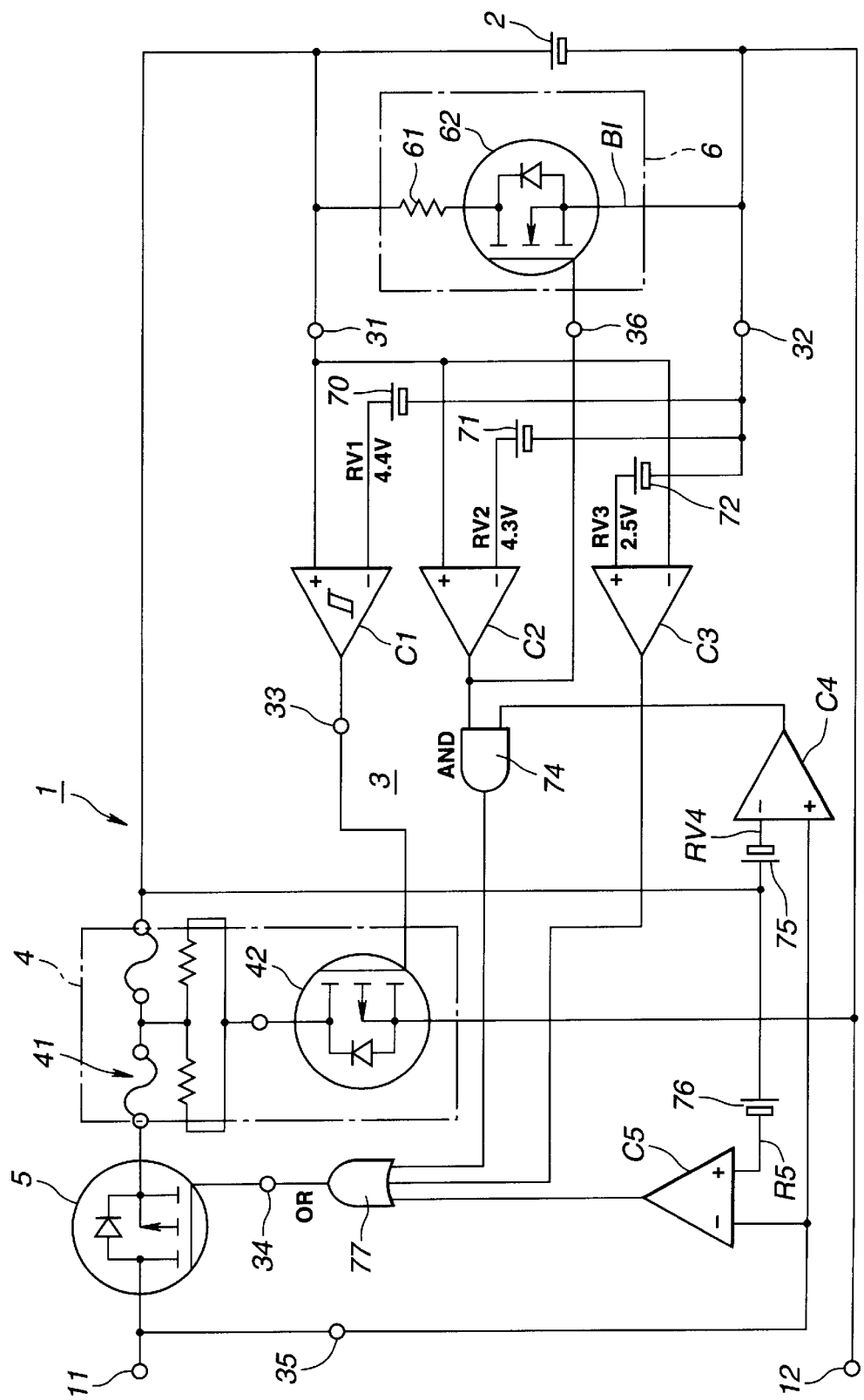
FIG. 8 is a circuit diagram for illustrating the specified internal structure of a detection control IC of the third embodiment of the battery pack.

In FIG. 8, an output terminal of the second over-charging detection unit C2 is connected via a bypass current control terminal 36 to the gate of the bypass FET 62 of the bypass unit 6. Thus, if the output of the second over-charging detection unit C2 is at the H level, the bypass FET 62 is turned on so that there flows the bypass current.

If the bypass current value is larger than the current flowing from the charger when the discharging controlling FET 5 is off, the charging current flows in its entirety to the bypass unit 6.

In the present third embodiment, the output of the second over-charging detection unit C2 is used for controlling the bypass unit 6. It is, however, also possible to set the detection voltage to a different value, referred to below as the bypass reference voltage RVx, and to use this bypass reference voltage RVx to perform bypass control. Meanwhile, it is nonsensical to set the bypass reference voltage RVx so as to be lower than the over-discharging detection reference voltage RV3 or so as to be higher than the first over-discharging detection reference voltage RV1 of the first over-charging detection unit C1.

In the above-described embodiments, a parallax information—channel FET is used for the high side. Alternatively, a N-channel FET may also be used as the low side. The fuse fitted with the heater may be provided on the high side or on the low side, whichever is desired.

Figure 9:
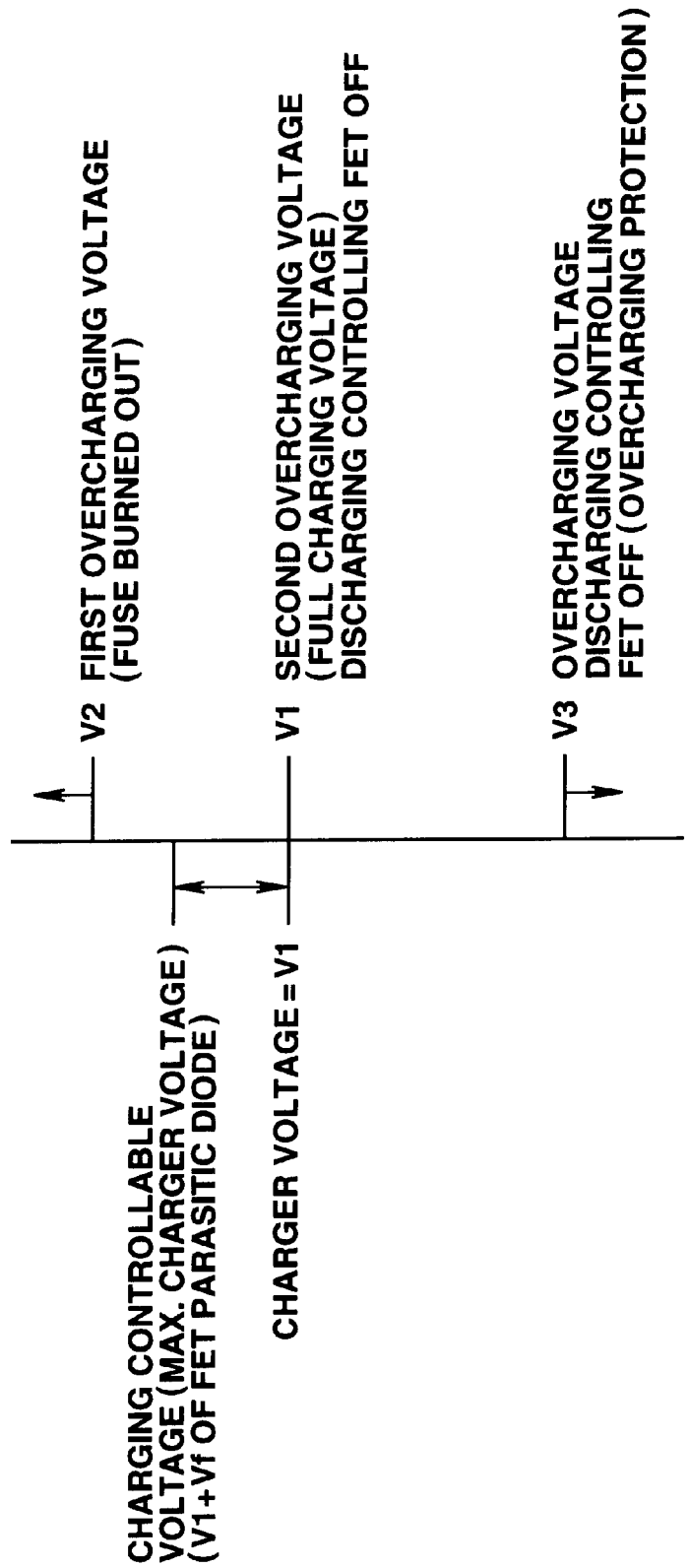
FIG. 9 is a diagrammatic view for conceptually illustrating the relation between a first over-charging voltage, a second over-charging voltage (full charging voltage) and an over-discharging voltage.

FIG. 9 conceptually shows the relation between the first overcharging voltage, second overcharging voltage (full charging voltage) and the overcharging voltage in the respective embodiments of the present invention.

In this figure, V2 is equivalent to the first overcharging voltage. For a voltage higher than this, it becomes necessary to perform over-charging protection, that is, the fuse needs to be blown off.

In the drawing, V1 is equivalent to the second overcharging voltage (full over-charging voltage). It is necessary to control the voltage in the charger or in the battery pack so that this voltage V1 is reached. That is, if the full charging voltage is to be controlled in the charger, the charger voltage is set to V1. On the other hand, if the full charging voltage is to be controlled within the battery pack, the charging control voltage is set to V1. Specifically, the voltage for the discharging controlling FET 5 being off is set to V1. It is noted that, if there is provided the second over-charging detection unit C2, its detection voltage is the full charging voltage and the discharging controlling FET 5 is off, the charging voltage of the battery pack is controlled to the full charging voltage even if the charger voltage is set to the above range. If the charger current is smaller than the bypass current, the battery pack charger voltage is controlled to the full charging voltage even if the voltage is higher than the above range.

In the drawing, V3 corresponds to the over-charging voltage. For a voltage not higher than V3, over-charging protection is to be performed, that is the discharging controlling FET 5 needs to be turned off for over-charging protection.

In the drawing, Vc is V1+Vf, where Vf is the forward voltage drop of a parasitic diode of the EFT. That is, Vc is the allowed maximum charger voltage when the charging control is to be made by the discharging controlling FET. If a voltage exceeding the voltage Vc is applied, charging control is invalid.

Figure 10:
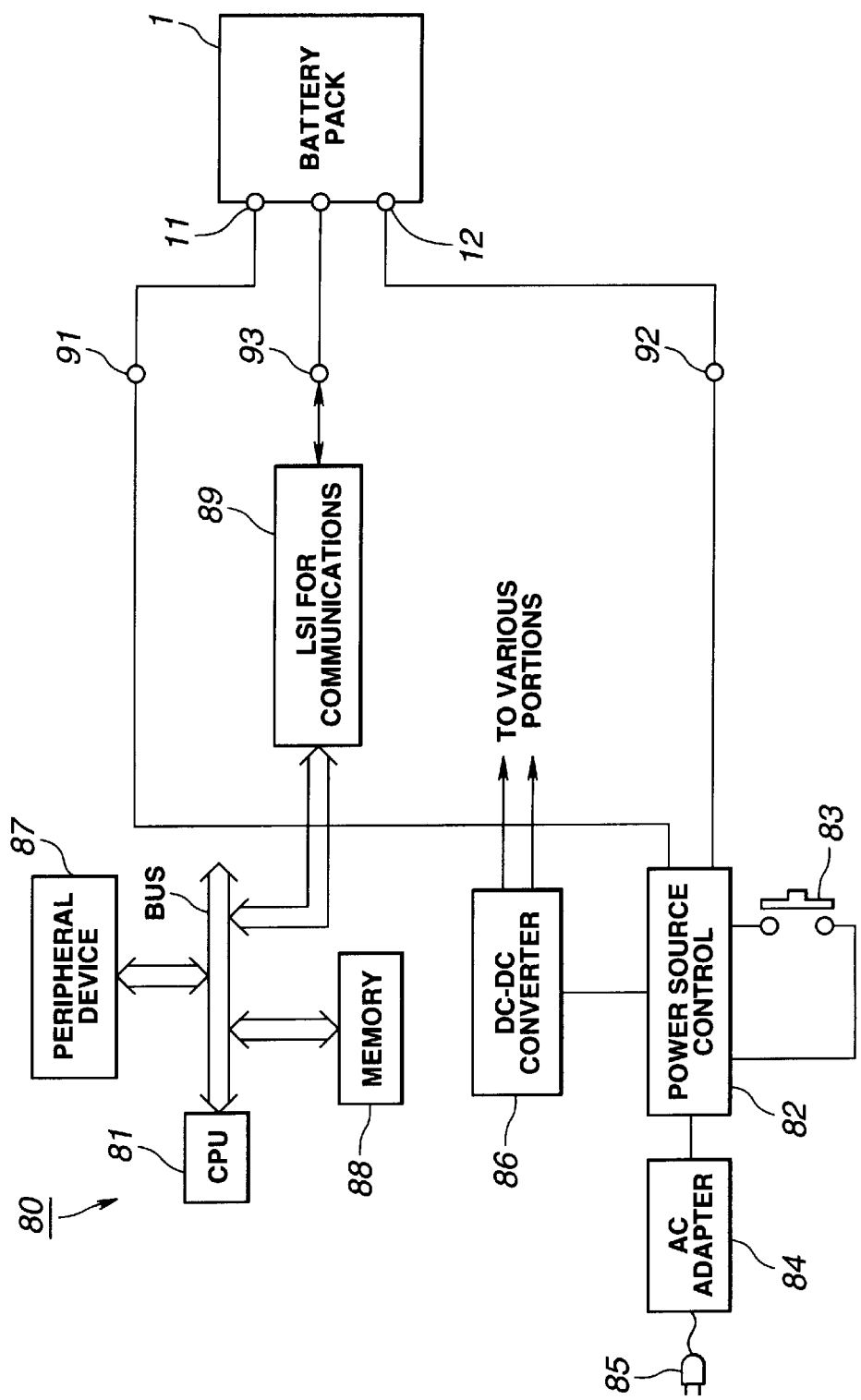
FIG. 10 is a block circuit diagram showing an illsutrative structure of a system employing a battery pack having a battery protection circuit according to each embodiment of the present invention.

Referring to FIG. 10, an illustrative structure of a system employing a battery protection circuit of each of the above-described embodiments of the present invention is explained.

The configuration shown in FIG. 10 includes a battery pack 1, having the above-described battery protection circuit embodying the present invention, and a personal computer 80, as an example of an electronic equipment on which to load the battery pack 1. This personal computer 80 is, for example, a portable notebook personal computer on which can be removably loaded the battery pack 1. The personal computer 80 is in operation with the power supplied from this battery pack 1.

The personal computer 80 has a main bus line BUS to a CPU (central processing unit), to which are connected various peripheral devices 87, a memory 88, such as a ROM (read-only memory), a RAM (random-access memory), and a communication LSI 189. A power source control circuit 82 includes a power switch 83 used for controlling power on/off and to which is supplied the commercial AC source from a power source plug 85 via an AC adapter 12. A plus terminal 91 and a minus terminal 92 for connection to the battery pack can be connected to the plus terminal 11 and the minus terminal 12 of the battery pack 1 of the preferred embodiment and are adapted to be supplied with the power from the battery pack 1. Also, the charging current is supplied to the battery pack 1 via these terminals 11, 12, 91 and 92. That is, on loading the battery pack 1 of the instant embodiment in a battery housing section, not shown, of the personal computer 80, the plus terminal 11 of the battery pack 1 is electrically connected to the plus terminal 91 of the personal computer 80, while the minus terminal 12 of the battery pack is electrically connected to the minus terminal 92 of the personal computer 80. Thus, the discharging current of the battery cell 2 in the battery pack 1 is supplied from the plus terminal 11 and the minus terminal 12 of the battery pack 1 to the plus terminal 91 and the minus terminal 92 of the personal computer 80. Conversely, the discharging current for the battery pack 1 is sent from the plus terminal 91 and the minus terminal 92 of the personal computer 80 towards the plus terminal 11 and to the minus terminal 12 of the battery pack 1.

The battery pack I of the preferred embodiment includes a micro-computer, not shown, for monitoring the state of the battery cell 2, such as the voltage, charging/discharging current or the residual capacity of the battery cell, to assure data transmission/reception between the battery cell 2 and the personal computer 80. On the side of the personal computer 80, the state of the battery cell 2, transmitted thereto from the micro-computer of the battery pack I over a communication terminal 93, is displayed on, for example, a display, to apprise the user of the state of the battery cell 2. That is, the micro-computer of the battery pack 1 can have communications with the communication LSI 189 of the personal computer 80 in accordance with a pre-set communication sequence, so that the micro-computer performs pre-set processing in accordance with the data sent thereto from the personal computer 80, such as commands, or transmits to the communication terminal 93 of the personal computer 80 the battery voltage, charging/discharging current, residual capacity of the battery cell, integrated capacity or the state of the fuse fitted with the heater, that is whether or not the fuse has been blown off. The personal computer 80 receives the data sent from the battery pack 1 by the communication LSI 189 and sends it to the CPU 81 to grasp the battery voltage, charging/discharging current, residual capacity of the battery cell, integrated capacity or the state of the fuse fitted with the heater from the received data for display on, for example, a liquid crystal display.

Figure 11:
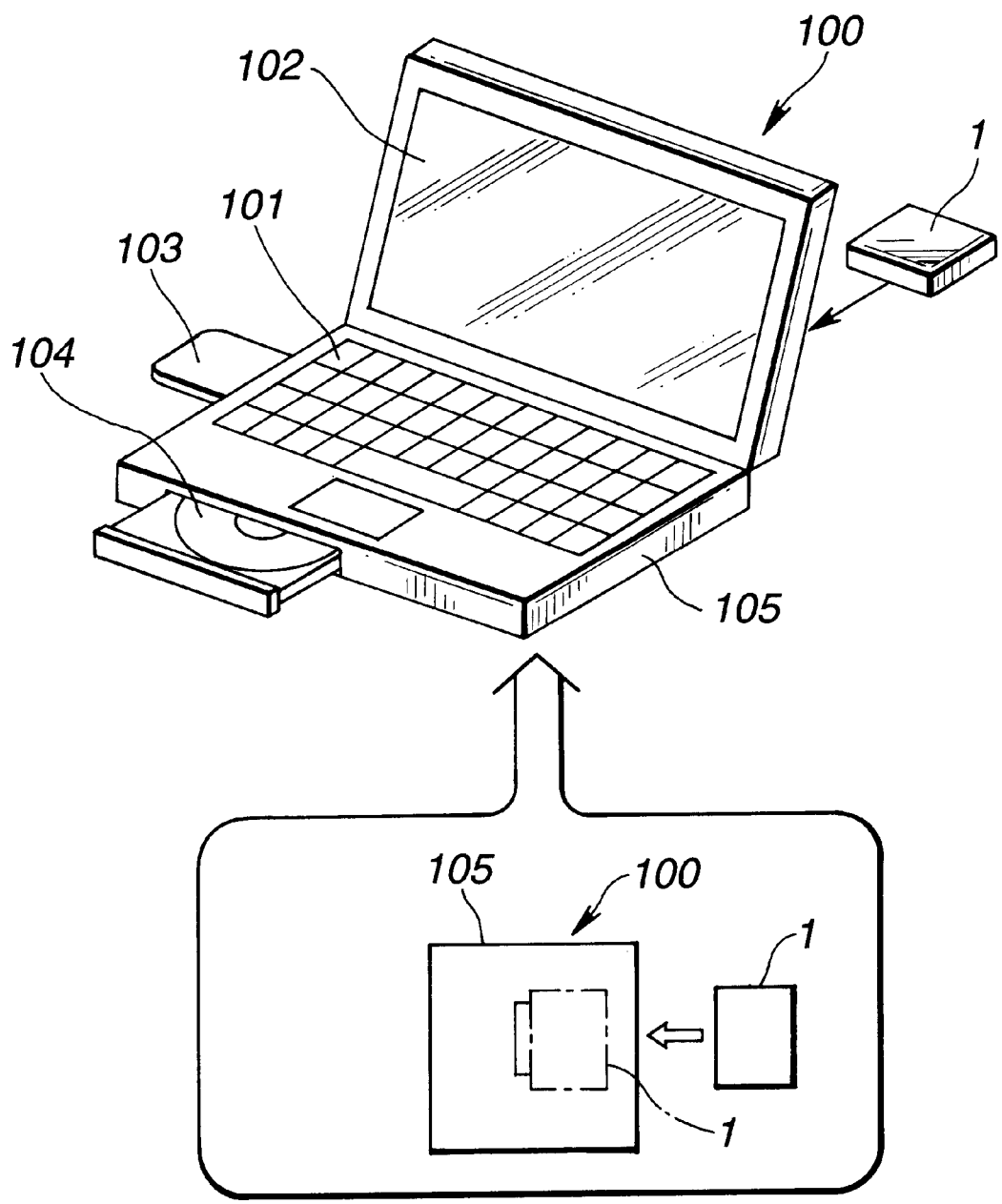
FIG. 11 is a perspective view showing how a battery pack equipped with the battery protection circuit of each embodiment of the present invention is loaded on a note-book type personal computer.

FIG. 11 shows how the battery pack 1 embodying the present invention is to be loaded on a note-book type personal computer 100, as an example of the personal computer 80 of FIG. 10.

A main body portion 105 of the note-book type personal computer 100 includes a keyboard 101, a display 102, a slot in which to load a card 103, and a drive 104 for a CD-ROM (read-only memory exploiting a compact disc) or a DVD-ROM (read-only memory exploiting a digital video disc or a digital versatile disc).

To the main body portion 105, the battery pack 1 can be detachably mounted and electrically connected via the plus terminal 91 and the minus terminal 92 as electrical connecting portions. This battery pack 1 has the above-described battery protection circuit embodying the present invention and furnishes the operating current for the note-book type personal computer 100 or is charged by the computer 100.

What is claimed is:

1. A battery protection circuit comprising:

first over-charging detection means for detecting at least a first over-charging state of a secondary battery;

fuse means connected to a current path of said secondary battery and fitted with a heater;

heater driving means for driving said heater of said fuse means, said heater driving means driving the heater of said fuse means to blow off the fuse when the first over-charging state is detected;

a discharging controlling switching element connected to the current path of said secondary battery;

switching controlling means for controlling the switching operation of said discharging controlling switching element;

second over-charging/excess current detection means for detecting a second over-charging state or the excess discharging current state of said secondary battery; and said switching controlling means controlling said discharging controlling switching element to its off-state to break the discharging current when detection of the second over-charging state or the excess discharging current is established.

2. The battery protection circuit according to claim 1 wherein said discharging controlling switching element is a field effect transistor having a parasitic diode.

3. The battery protection circuit according to claim 1 wherein said excess charging detection means detects the over-charging state of said secondary battery, using a first over-charging detection voltage value and a second over-charging detection voltage higher than said first over-charging detection voltage value;

when the over-charging detection by said first over-charging detection voltage value is established, said discharging controlling switching element is controlled to its off-state by said switching controlling means to break the charging current; and wherein when the over-charging detection by said second over-charging detection voltage value is established, said heater of said fuse means is driven by said heater driving means to blow off the fuse.

4. The battery protection circuit according to claim 3 further comprising:

bypass means connected to the current path of said secondary battery for bypassing the charging of said secondary battery; and bypass control means for controlling said bypass means; wherein if overcharging is detected by said first over-charging detection means to be a value higher than said first overcharging detection voltage value and lower than said second over-charging detection voltage value then a by-pass current smaller than the charging current and in excess of a pre-set current is caused to flow by said bypass control means.

5. An electronic device operated by the current supplied from a secondary battery and adapted to charge said secondary battery, comprising:

a battery pack including:

over-charging detection means for detecting at least a first over-charging state of a secondary battery;

fuse means fitted with a heater, said fuse means fitted with the heater being connected to a current path of said secondary battery; and heater driving means for driving the heater of said fuse means;

said heater driving means driving the heater of said fuse means to blow off the fuse when the first over-charging state is detected;

a discharging controlling switching element connected to the current path of said secondary battery;

switching controlling means for controlling the switching operation of said discharging controlling switching element;

second over-charging/excess current detection means for detecting a second over-charging state or the excess discharging current state of said secondary battery; and said switching controlling means controlling said discharging controlling switching element to its off-state to break the discharging current when detection of the second over-charging state or the excess discharging current is established.

6. The electronic device according to claim 5 further comprising:

a loading unit for detachably mounting said battery pack; and an electrical connecting portion for said battery pack.

* * * * *